(No Model.) 3 Sheets—Sheet 1.

J. J. BRADLEY.
DYNAMO ELECTRIC MACHINE.

No. 324,075. Patented Aug. 11, 1885.

ATTEST:
E. B. Rowland
M. E. Fowler.

INVENTOR:
James J. Bradley
By Dyer & Seely
Attys (No Model.) 3 Sheets—Sheet 2.

J. J. BRADLEY.
DYNAMO ELECTRIC MACHINE.

No. 324,075. Patented Aug. 11, 1885.

ATTEST:
E. K. Rowland
M. E. Fowler

INVENTOR:
James J. Bradley
By Dyer & Seely
Attys.

(No Model.)  3 Sheets—Sheet 3.

J. J. BRADLEY.
DYNAMO ELECTRIC MACHINE.

No. 324,075.  Patented Aug. 11, 1885.

ATTEST:  
E. C. Rowland  
M. E. Fowler

INVENTOR:  
James J. Bradley  
By Dyer & Seely  
Attys.

UNITED STATES PATENT OFFICE.

JAMES J. BRADLEY, OF HARRISON, ASSIGNOR OF ONE-HALF TO FRANCIS R. UPTON, OF ORANGE, NEW JERSEY.

DYNAMO-ELECTRIC MACHINE.

SPECIFICATION forming part of Letters Patent No. 324,075, dated August 11, 1885.

Application filed July 23, 1884. (No model.)

*To all whom it may concern:*

Be it known that I, JAMES J. BRADLEY, of Harrison, in the county of Hudson and State of New Jersey, have invented a certain new and useful Improvement in Dynamo-Electric Machines, of which the following is a specification.

The object I have in view is to produce simple and efficient means for giving the shafts of dynamo electric or other machines a positive reciprocating movement for the purpose of producing a uniform wearing of the commutator and journals of a dynamo-electric machine, and for distributing the lubricant upon the journals of any machine to which the invention may be applied, thereby preventing heating of same.

Figure 1:
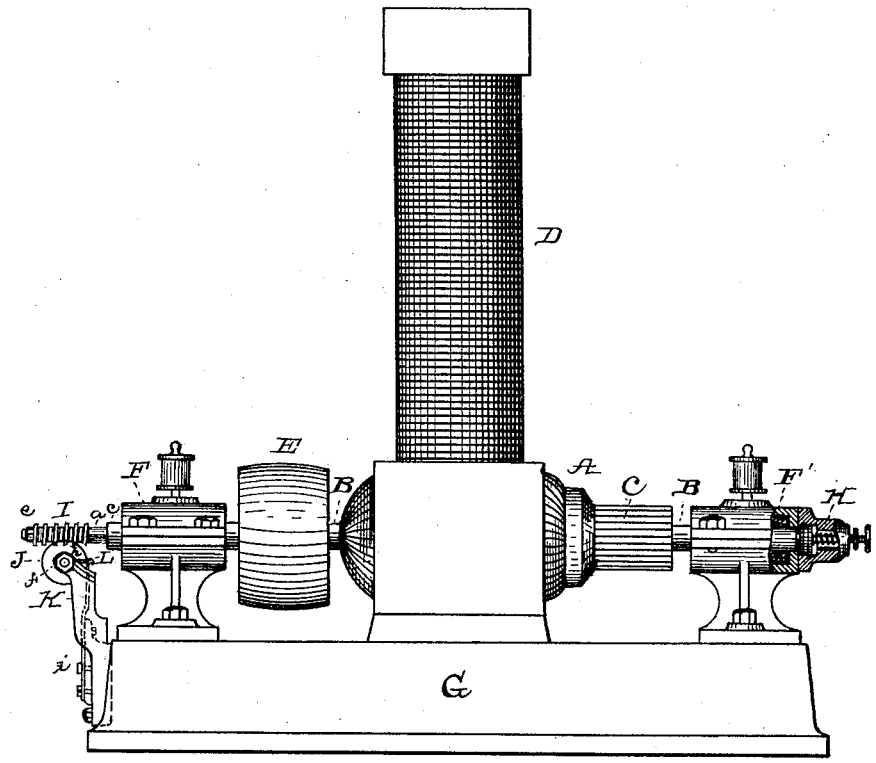
Figure 2:
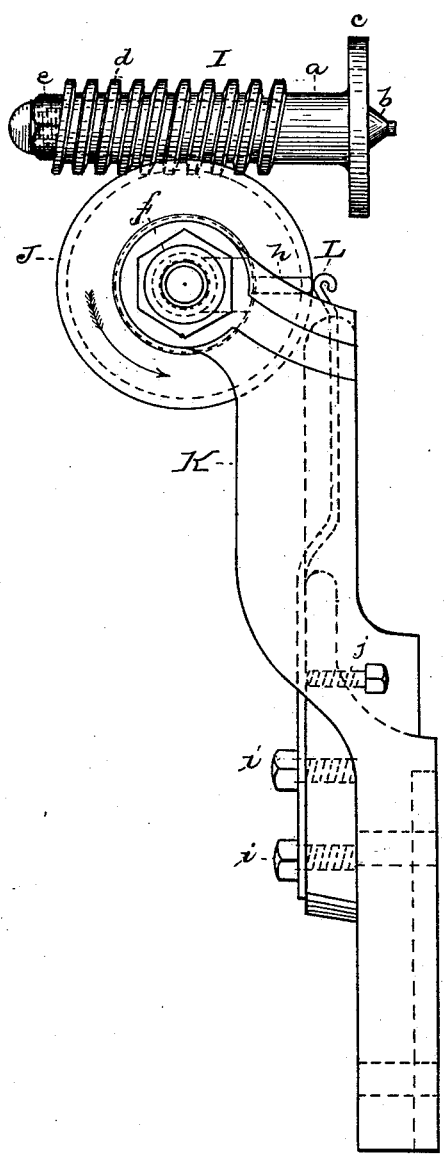
Figure 3:
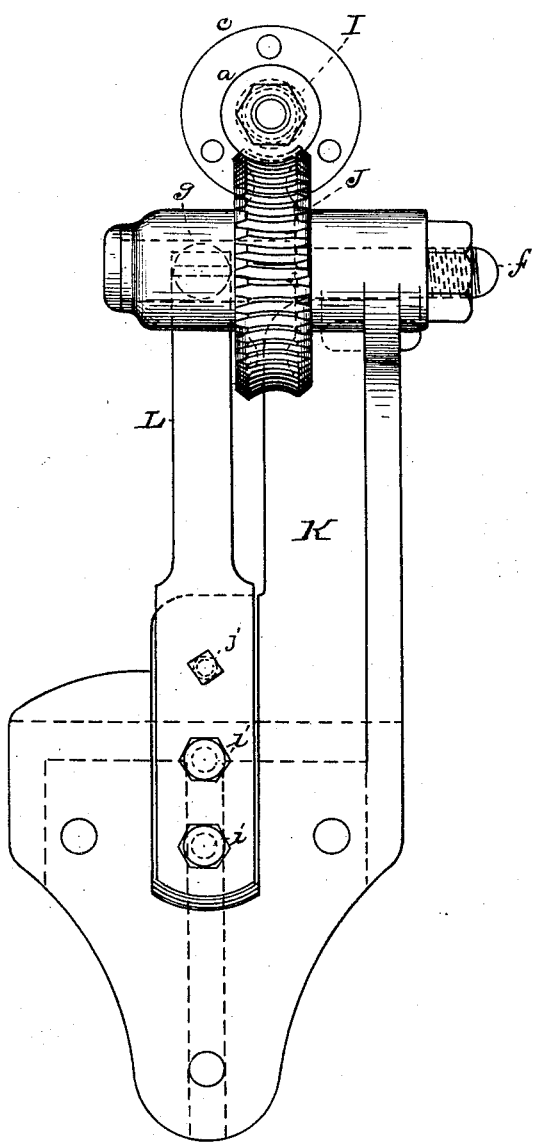
Figure 4:
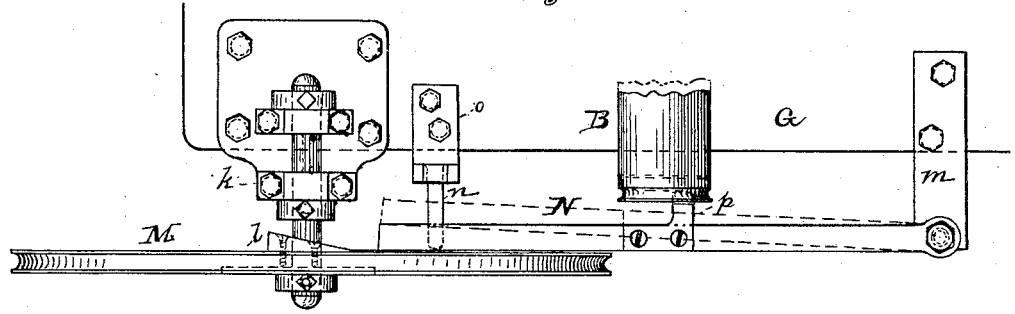
Figure 5:
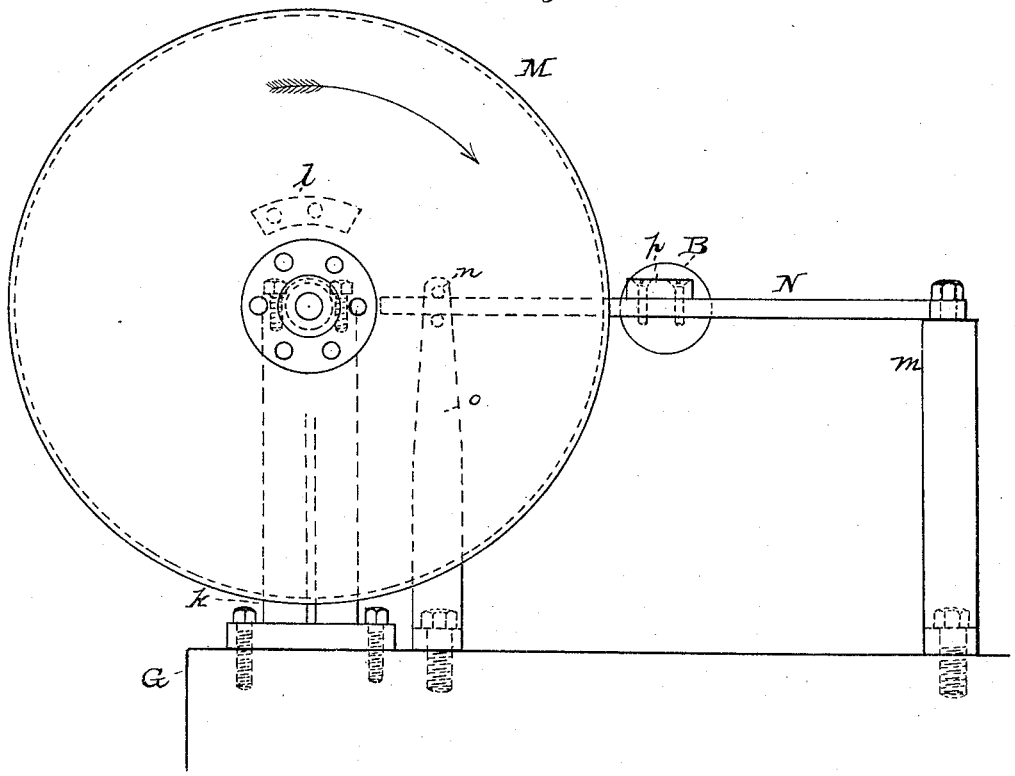

In the accompanying drawings, forming a part hereof, Figure 1 is a side elevation and partial section of a machine embodying the invention. Fig. 2 is a side elevation on a larger scale of the device for imparting a positive reciprocating movement to the shaft. Fig. 3 is a front view of such device, and Figs. 4 and 5 top and end views of a modified form of the reciprocating device.

A is the armature of a dynamo-electric machine, mounted upon shaft B. C is the commutator, and D the field-magnet, of the machine. The armature is revolved by a belt (not shown) running upon pulley E on the armature-shaft, which is supported in journal-boxes F F', carried by pillow-blocks rising from the base G, upon which the magnet is also mounted. The attraction of the pulley E by the polar extensions of the field-magnet is counterbalanced by a spring-box, H, at the commutator end of the shaft, the result being a balanced shaft free to be moved longitudinally in its bearings to a limited extent.

To automatically give the shaft a positive reciprocating movement, I provide a mechanical device at the end of the shaft opposite the spring-box, which intermittently moves said shaft longitudinally, and then releases it, permitting it to play back and forth in its bearings, controlled only by the balancing and limiting devices, until it is again moved by such reciprocating mechanism. This automatic reciprocating mechanism preferably receives motion from the armature-shaft itself, making the machine self-contained in this respect, although it may be moved by belt or other connection with a driving-shaft or other moving part.

The preferred form of the device is illustrated in Figs. 1, 2, and 3, to which reference is now more particularly made.

Upon the end of the armature-shaft opposite the spring-box, and where it projects through the journal-box F, is secured a worm, I, engaging with a worm-wheel, J, mounted loosely upon a standard, K, secured to and rising from the base-plate G. This worm is composed of a shouldered bolt, *a*, having a central stud, *b*, entering a hole bored centrally in the end of the armature-shaft, and a flange, *c*, adapted to receive screws entering holes in said shaft, and a worm sleeve, *d*, secured upon said shoulder bolt by a nut, *e*. The worm-wheel J is mounted upon a stud-bolt, *f*, and has on one side an extended hub, *g*, from which projects a stud, *h*. This stud strikes, once during each revolution of the worm-wheel, the beveled end of a heavy plate-spring, L, which is secured by screws *i* to standard K, and has its tension regulated by an adjustable screw, *j*. The operation of these parts is as follows: The worm-wheel is turned by the worm in the direction shown by the arrow in Fig. 2, said worm-wheel, in addition, being rocked on the stud-bolt by the longitudinal movement of the armature-shaft and worm. When, however, the stud *h* strikes the beveled end of spring L, the movement of the worm-wheel is stopped or retarded, and the armature-shaft is thrust back until there is sufficient compression of the spring in the spring-box at the other end of the shaft to overcome the retarding force of spring L, when the stud *h* is forced past the end of L, and the armature-shaft is free to ride forward in its bearings. The end of spring L may be formed to assist this forward movement, although the balancing devices of the shaft are sufficient to produce it. The shaft continues to play back and forth in its bearings until in the revolution of the worm-wheel the stud again strikes the spring, when the shaft is again moved positively in a longitudinal direction, and is released, as before explained. An automatic reciprocating device like that shown in Figs. 4 and 5 may be used. Here a wheel, M, is mounted upon a standard, *k*, rising from base G at the end of the balanced armature-shaft B, opposite the spring-box and to one side of said shaft. This wheel is given a revolving movement by a belt (not shown) running to a driving-shaft or any other moving part. It carries near its hub a beveled block, $l$, which once each revolution of the wheel strikes the end of a horizontal lever, N. This lever extends across the end of the armature-shaft, being pivoted to move horizontally upon a standard, $m$, and being guided near its free end by pins $n$ on a standard, $o$. The lever N has a block, $p$, which strikes the armature-shaft and gives it a longitudinal thrust each time the lever is moved by the beveled block $l$ on the revolving wheel M.

The means described for giving the shaft of a dynamo-electric machine a reciprocating movement may also be applied to machines which are similar to dynamo-electric machines in this respect, that their main shafts are free to be moved longitudinally to a limited extent without affecting the operation of the machines, and such machines may have their shafts balanced by spring-boxes or otherwise, the same as described of the dynamo-electric machine.

What I claim is—

1. In a dynamo-electric or similar machine, the combination, with the shaft of the machine, balanced in its bearings, of an automatically-acting device intermittently giving such shaft a positive longitudinal movement, substantially as set forth.

2. In a dynamo-electric machine, the combination, with the armature-shaft having a pulley on one side of the field-magnet, and a spring at the opposite end of the shaft balancing the attractive force exerted by the magnet upon the pulley, of an automatically-acting device intermittently giving such shaft a positive longitudinal movement, substantially as set forth.

3. In a dynamo-electric or similar machine, the combination, with the shaft of the machine, having a spring at one end, of an automatically-acting device located at the opposite end of said shaft, and intermittently giving such shaft a positive longitudinal movement, substantially as set forth.

4. In a dynamo-electric or similar machine, a mechanically-operated device acting upon the shaft of the machine to give it a positive longitudinal movement, substantially as and for the purpose set forth.

5. In a dynamo-electric or similar machine, the combination, with a balanced shaft, of a mechanically-operated device acting upon said shaft intermittently to give it a positive longitudinal movement, substantially as set forth.

6. In a dynamo-electric or similar machine, the combination, with the shaft of the machine, of a mechanical device receiving movement from said shaft, and acting thereon to give it a positive longitudinal movement, substantially as set forth.

7. The combination, with a shaft, of a worm secured thereto, a worm-wheel, and a device resisting the movement of such worm-wheel at intervals, substantially as and for the purpose set forth.

8. The combination, with a shaft, of the worm, the worm-wheel, the stud, and the resisting-spring, substantially as and for the purpose set forth.

This specification signed and witnessed this 30th day of June, 1884.

JAMES J. BRADLEY.

Witnesses:
PHILIP S. DYER,
WILLIAM J. LATUS.